United States Patent
Heap et al.

(10) Patent No.: US 8,448,731 B2
(45) Date of Patent: May 28, 2013

(54) METHOD AND APPARATUS FOR DETERMINATION OF FAST ACTUATING ENGINE TORQUE FOR A HYBRID POWERTRAIN SYSTEM

(75) Inventors: Anthony H. Heap, Ann Arbor, MI (US); Wilfried Brunssen, Ypsilanti, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 1254 days.

(21) Appl. No.: 12/254,888

(22) Filed: Oct. 21, 2008

(65) Prior Publication Data
US 2009/0118971 A1    May 7, 2009

Related U.S. Application Data

(60) Provisional application No. 60/985,415, filed on Nov. 5, 2007.

(51) Int. Cl.
*B60W 10/06* (2006.01)

(52) U.S. Cl.
USPC ............ 180/65.28; 180/65.275; 701/22

(58) Field of Classification Search
USPC ............ 180/65.275, 65.28; 123/406.11, 123/406.12, 406.23; 701/22
See application file for complete search history.

(56) References Cited

U.S. PATENT DOCUMENTS

| | | | |
|---|---|---|---|
| 5,431,242 A | 7/1995 | Iwata et al. | |
| 5,479,898 A * | 1/1996 | Cullen et al. | 123/350 |
| 5,951,614 A * | 9/1999 | Tabata et al. | 701/54 |
| 6,126,570 A * | 10/2000 | Bohm et al. | 477/107 |
| 6,178,371 B1 | 1/2001 | Light et al. | |
| 6,359,404 B1 * | 3/2002 | Sugiyama et al. | 318/432 |
| 6,406,403 B1 * | 6/2002 | Steeby | 477/109 |
| 6,468,183 B1 * | 10/2002 | O'Neil et al. | 477/107 |
| 6,687,591 B2 * | 2/2004 | Abe | 701/54 |
| 6,832,148 B1 | 12/2004 | Bennett | |
| 6,856,034 B2 * | 2/2005 | Peters et al. | 290/40 C |
| 6,868,318 B1 | 3/2005 | Cawthorne | |
| 6,904,881 B2 * | 6/2005 | Hirowatari et al. | 123/90.15 |
| 7,047,932 B2 * | 5/2006 | Surnilla et al. | 123/198 F |

(Continued)

FOREIGN PATENT DOCUMENTS

| EP | 1439330 A2 | 7/2004 |
|---|---|---|
| EP | 1624171 A2 | 2/2006 |

(Continued)

*Primary Examiner* — J. Allen Shriver, II
*Assistant Examiner* — Travis Coolman

(57) ABSTRACT

An engine is coupled to an input member of a hybrid transmission and the hybrid transmission is operative to transfer torque between the input member and a torque machine and an output member to generate an output torque in response to an operator torque request. The torque machine is connected to an energy storage device. A method for controlling the engine includes determining a preferred input torque from the engine to the hybrid transmission based upon operator inputs to an accelerator pedal and a brake pedal, determining maximum and minimum allowable input torques from the engine to the hybrid transmission, controlling the engine at the preferred input torque when the preferred input torque is within the maximum and minimum allowable input torques, and controlling the engine based upon the maximum and minimum allowable input torques when the preferred input torque is outside one of the maximum and minimum allowable input torques.

11 Claims, 7 Drawing Sheets

U.S. PATENT DOCUMENTS

| | | | |
|---|---|---|---|
| 7,154,236 | B1 | 12/2006 | Heap |
| 7,189,177 | B2 * | 3/2007 | Takasu et al. .................. 475/5 |
| 7,440,827 | B2 * | 10/2008 | Kawada et al. ................. 701/22 |
| 7,674,204 | B2 * | 3/2010 | Turpin et al. .................. 477/181 |
| 7,857,082 | B2 * | 12/2010 | Gray, Jr. ..................... 180/65.28 |
| 7,869,912 | B2 * | 1/2011 | Kishimoto ..................... 701/22 |
| 8,000,866 | B2 * | 8/2011 | Heap et al. .................... 701/54 |
| 8,078,371 | B2 * | 12/2011 | Cawthorne et al. ............. 701/54 |
| 8,095,254 | B2 * | 1/2012 | Heap et al. .................... 701/22 |
| 8,200,403 | B2 * | 6/2012 | Heap et al. .................... 701/54 |
| 8,219,272 | B2 * | 7/2012 | Seel et al. ..................... 701/22 |
| 2002/0129788 | A1 * | 9/2002 | O'Neil et al. ................. 123/350 |
| 2005/0076958 | A1 | 4/2005 | Foster |
| 2005/0077867 | A1 | 4/2005 | Cawthorne |
| 2005/0077877 | A1 | 4/2005 | Cawthorne |
| 2005/0080523 | A1 | 4/2005 | Bennett |
| 2005/0080527 | A1 | 4/2005 | Tao |
| 2005/0080535 | A1 | 4/2005 | Steinmetz |
| 2005/0080537 | A1 | 4/2005 | Cawthorne |
| 2005/0080538 | A1 | 4/2005 | Hubbard |
| 2005/0080539 | A1 | 4/2005 | Hubbard |
| 2005/0080540 | A1 | 4/2005 | Steinmetz |
| 2005/0080541 | A1 | 4/2005 | Sah |
| 2005/0182526 | A1 | 8/2005 | Hubbard |
| 2005/0182543 | A1 | 8/2005 | Sah |
| 2005/0182546 | A1 | 8/2005 | Hsieh |
| 2005/0182547 | A1 | 8/2005 | Sah |
| 2005/0189918 | A1 | 9/2005 | Weisgerber |
| 2005/0252283 | A1 | 11/2005 | Heap |
| 2005/0252305 | A1 | 11/2005 | Hubbard |
| 2005/0252474 | A1 | 11/2005 | Sah |
| 2005/0255963 | A1 | 11/2005 | Hsieh |
| 2005/0255964 | A1 | 11/2005 | Heap |
| 2005/0255965 | A1 | 11/2005 | Tao |
| 2005/0255966 | A1 | 11/2005 | Tao |
| 2005/0255967 | A1 | 11/2005 | Foster |
| 2005/0255968 | A1 | 11/2005 | Sah |
| 2005/0256617 | A1 | 11/2005 | Cawthorne |
| 2005/0256618 | A1 | 11/2005 | Hsieh |
| 2005/0256623 | A1 | 11/2005 | Hubbard |
| 2005/0256625 | A1 | 11/2005 | Sah |
| 2005/0256626 | A1 | 11/2005 | Hsieh |
| 2005/0256627 | A1 | 11/2005 | Sah |
| 2005/0256629 | A1 | 11/2005 | Tao |
| 2005/0256631 | A1 | 11/2005 | Cawthorne |
| 2005/0256633 | A1 | 11/2005 | Heap |
| 2005/0256919 | A1 | 11/2005 | Cawthorne |
| 2006/0194670 | A1 | 8/2006 | Heap |
| 2007/0005211 | A1 * | 1/2007 | Katsumata et al. ............. 701/67 |
| 2007/0078580 | A1 | 4/2007 | Cawthorne |
| 2007/0093953 | A1 | 4/2007 | Heap |
| 2007/0149348 | A1 | 6/2007 | Holmes |
| 2007/0191181 | A1 | 8/2007 | Burns |
| 2007/0205036 | A1 * | 9/2007 | Ogata et al. ................... 180/337 |
| 2007/0225886 | A1 | 9/2007 | Morris |
| 2007/0225887 | A1 | 9/2007 | Morris |
| 2007/0225888 | A1 | 9/2007 | Morris |
| 2007/0225889 | A1 | 9/2007 | Morris |
| 2007/0260381 | A1 | 11/2007 | Sah |
| 2007/0276569 | A1 | 11/2007 | Sah |
| 2007/0284162 | A1 | 12/2007 | Zettel |
| 2007/0284163 | A1 | 12/2007 | Heap |
| 2007/0284176 | A1 | 12/2007 | Sah |
| 2007/0285059 | A1 | 12/2007 | Zettel |
| 2007/0285060 | A1 | 12/2007 | Zettel |
| 2007/0285061 | A1 | 12/2007 | Zettel |
| 2007/0285063 | A1 | 12/2007 | Zettel |
| 2007/0285097 | A1 | 12/2007 | Zettel |
| 2008/0004779 | A1 | 1/2008 | Sah |
| 2008/0028879 | A1 | 2/2008 | Robinette |
| 2008/0032855 | A1 | 2/2008 | Sah |
| 2008/0064559 | A1 | 3/2008 | Cawthorne |
| 2008/0064562 | A1 | 3/2008 | Zettel |
| 2008/0103003 | A1 | 5/2008 | Sah |
| 2008/0119320 | A1 | 5/2008 | Wu |
| 2008/0119321 | A1 | 5/2008 | Heap |
| 2008/0120000 | A1 | 5/2008 | Heap |
| 2008/0120001 | A1 | 5/2008 | Heap |
| 2008/0120002 | A1 | 5/2008 | Heap |
| 2008/0176706 | A1 | 7/2008 | Wu |
| 2008/0176709 | A1 | 7/2008 | Wu |
| 2008/0181280 | A1 | 7/2008 | Wang |
| 2008/0182696 | A1 | 7/2008 | Sah |
| 2008/0183372 | A1 | 7/2008 | Snyder |
| 2008/0234097 | A1 | 9/2008 | Sah |
| 2008/0236921 | A1 | 10/2008 | Huseman |
| 2008/0243346 | A1 | 10/2008 | Huseman |
| 2008/0249745 | A1 | 10/2008 | Heap |
| 2008/0262694 | A1 | 10/2008 | Heap |
| 2008/0262698 | A1 | 10/2008 | Lahti |
| 2008/0272717 | A1 | 11/2008 | Gleason |
| 2008/0275611 | A1 | 11/2008 | Snyder |
| 2008/0275624 | A1 | 11/2008 | Snyder |
| 2008/0275625 | A1 | 11/2008 | Snyder |
| 2008/0287255 | A1 | 11/2008 | Snyder |
| 2009/0069148 | A1 | 3/2009 | Heap |
| 2009/0069989 | A1 | 3/2009 | Heap |
| 2009/0070019 | A1 | 3/2009 | Heap |
| 2009/0082170 | A1 | 3/2009 | Heap |
| 2009/0088294 | A1 | 4/2009 | West |
| 2009/0105039 | A1 | 4/2009 | Sah |
| 2009/0105896 | A1 | 4/2009 | Tamai |
| 2009/0105898 | A1 | 4/2009 | Wu |
| 2009/0105914 | A1 | 4/2009 | Buur |
| 2009/0107745 | A1 | 4/2009 | Buur |
| 2009/0107755 | A1 | 4/2009 | Kothari |
| 2009/0108673 | A1 | 4/2009 | Wang |
| 2009/0111637 | A1 | 4/2009 | Day |
| 2009/0111640 | A1 | 4/2009 | Buur |
| 2009/0111642 | A1 | 4/2009 | Sah |
| 2009/0111643 | A1 | 4/2009 | Sah |
| 2009/0111644 | A1 | 4/2009 | Kaminsky |
| 2009/0111645 | A1 | 4/2009 | Heap |
| 2009/0112385 | A1 | 4/2009 | Heap |
| 2009/0112392 | A1 | 4/2009 | Buur |
| 2009/0112399 | A1 | 4/2009 | Buur |
| 2009/0112412 | A1 | 4/2009 | Cawthorne |
| 2009/0112416 | A1 | 4/2009 | Heap |
| 2009/0112417 | A1 | 4/2009 | Kaminsky |
| 2009/0112418 | A1 | 4/2009 | Buur |
| 2009/0112419 | A1 | 4/2009 | Heap |
| 2009/0112420 | A1 | 4/2009 | Buur |
| 2009/0112421 | A1 | 4/2009 | Sah |
| 2009/0112422 | A1 | 4/2009 | Sah |
| 2009/0112423 | A1 | 4/2009 | Foster |
| 2009/0112427 | A1 | 4/2009 | Heap |
| 2009/0112428 | A1 | 4/2009 | Sah |
| 2009/0112429 | A1 | 4/2009 | Sah |
| 2009/0112495 | A1 | 4/2009 | Center |
| 2009/0115349 | A1 | 5/2009 | Heap |
| 2009/0115350 | A1 | 5/2009 | Heap |
| 2009/0115351 | A1 | 5/2009 | Heap |
| 2009/0115352 | A1 | 5/2009 | Heap |
| 2009/0115353 | A1 | 5/2009 | Heap |
| 2009/0115354 | A1 | 5/2009 | Heap |
| 2009/0115365 | A1 | 5/2009 | Heap |
| 2009/0115373 | A1 | 5/2009 | Kokotovich |
| 2009/0115377 | A1 | 5/2009 | Schwenke |
| 2009/0115408 | A1 | 5/2009 | West |
| 2009/0115491 | A1 | 5/2009 | Anwar |
| 2009/0118074 | A1 | 5/2009 | Zettel |
| 2009/0118075 | A1 | 5/2009 | Heap |
| 2009/0118076 | A1 | 5/2009 | Heap |
| 2009/0118077 | A1 | 5/2009 | Hsieh |
| 2009/0118078 | A1 | 5/2009 | Wilmanowicz |
| 2009/0118079 | A1 | 5/2009 | Heap |
| 2009/0118080 | A1 | 5/2009 | Heap |
| 2009/0118081 | A1 | 5/2009 | Heap |
| 2009/0118082 | A1 | 5/2009 | Heap |
| 2009/0118083 | A1 | 5/2009 | Kaminsky |
| 2009/0118084 | A1 | 5/2009 | Heap |
| 2009/0118085 | A1 | 5/2009 | Heap |
| 2009/0118086 | A1 | 5/2009 | Heap |
| 2009/0118087 | A1 | 5/2009 | Hsieh |
| 2009/0118089 | A1 | 5/2009 | Heap |
| 2009/0118090 | A1 | 5/2009 | Heap |
| 2009/0118091 | A1 | 5/2009 | Lahti |

| | | | | | | |
|---|---|---|---|---|---|---|
| 2009/0118093 A1 | 5/2009 | Heap | | 2009/0118935 A1 | 5/2009 | Heap |
| 2009/0118094 A1 | 5/2009 | Hsieh | | 2009/0118936 A1 | 5/2009 | Heap |
| 2009/0118877 A1 | 5/2009 | Center | | 2009/0118937 A1 | 5/2009 | Heap |
| 2009/0118879 A1 | 5/2009 | Heap | | 2009/0118938 A1 | 5/2009 | Heap |
| 2009/0118880 A1 | 5/2009 | Heap | | 2009/0118939 A1 | 5/2009 | Heap |
| 2009/0118882 A1 | 5/2009 | Heap | | 2009/0118940 A1 | 5/2009 | Heap |
| 2009/0118883 A1 | 5/2009 | Heap | | 2009/0118941 A1 | 5/2009 | Heap |
| 2009/0118884 A1 | 5/2009 | Heap | | 2009/0118942 A1 | 5/2009 | Hsieh |
| 2009/0118885 A1 | 5/2009 | Heap | | 2009/0118943 A1 | 5/2009 | Heap |
| 2009/0118886 A1 | 5/2009 | Tamai | | 2009/0118944 A1 | 5/2009 | Heap |
| 2009/0118887 A1 | 5/2009 | Minarcin | | 2009/0118945 A1 | 5/2009 | Heap |
| 2009/0118888 A1 | 5/2009 | Minarcin | | 2009/0118946 A1 | 5/2009 | Heap |
| 2009/0118901 A1 | 5/2009 | Cawthorne | | 2009/0118947 A1 | 5/2009 | Heap |
| 2009/0118914 A1 | 5/2009 | Schwenke | | 2009/0118948 A1 | 5/2009 | Heap |
| 2009/0118915 A1 | 5/2009 | Heap | | 2009/0118949 A1 | 5/2009 | Heap |
| 2009/0118916 A1 | 5/2009 | Kothari | | 2009/0118950 A1 | 5/2009 | Heap |
| 2009/0118917 A1 | 5/2009 | Sah | | 2009/0118951 A1 | 5/2009 | Heap |
| 2009/0118918 A1 | 5/2009 | Heap | | 2009/0118952 A1 | 5/2009 | Heap |
| 2009/0118919 A1 | 5/2009 | Heap | | 2009/0118954 A1 | 5/2009 | Wu |
| 2009/0118920 A1 | 5/2009 | Heap | | 2009/0118957 A1 | 5/2009 | Heap |
| 2009/0118921 A1 | 5/2009 | Heap | | 2009/0118962 A1 | 5/2009 | Heap |
| 2009/0118922 A1 | 5/2009 | Heap | | 2009/0118963 A1 | 5/2009 | Heap |
| 2009/0118923 A1 | 5/2009 | Heap | | 2009/0118964 A1 | 5/2009 | Snyder |
| 2009/0118924 A1 | 5/2009 | Heap | | 2009/0118969 A1 | 5/2009 | Heap |
| 2009/0118925 A1 | 5/2009 | Hsieh | | 2009/0118999 A1 | 5/2009 | Heap |
| 2009/0118926 A1 | 5/2009 | Heap | | 2009/0144002 A1 | 6/2009 | Zettel |
| 2009/0118927 A1 | 5/2009 | Heap | | | | |
| 2009/0118928 A1 | 5/2009 | Heap | | | | |
| 2009/0118929 A1 | 5/2009 | Heap | | | | |
| 2009/0118930 A1 | 5/2009 | Heap | | | | |
| 2009/0118931 A1 | 5/2009 | Kaminsky | | | | |
| 2009/0118932 A1 | 5/2009 | Heap | | | | |
| 2009/0118933 A1 | 5/2009 | Heap | | | | |
| 2009/0118934 A1 | 5/2009 | Heap | | | | |

FOREIGN PATENT DOCUMENTS

| | | |
|---|---|---|
| EP | 1837223 A1 | 9/2007 |
| GB | 2368924 A | 5/2002 |
| WO | WO 2007074118 A1 * | 7/2007 |

* cited by examiner

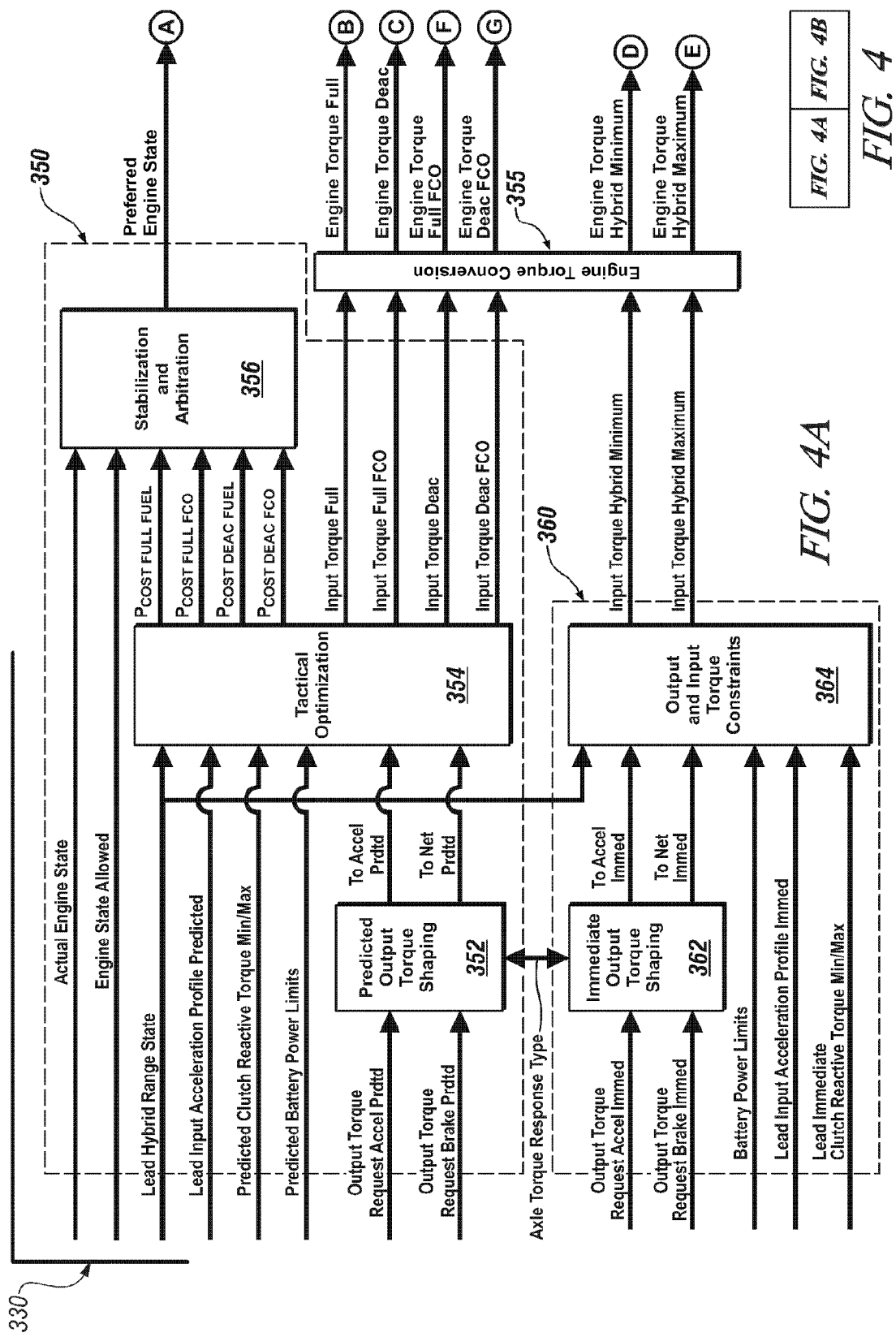

METHOD AND APPARATUS FOR DETERMINATION OF FAST ACTUATING ENGINE TORQUE FOR A HYBRID POWERTRAIN SYSTEM

CROSS REFERENCE TO RELATED APPLICATION

This application claims the benefit of U.S. Provisional Application No. 60/985,415 filed on Nov. 5, 2007 which is hereby incorporated herein by reference.

TECHNICAL FIELD

This disclosure is related to hybrid powertrain control systems.

BACKGROUND

The statements in this section merely provide background information related to the present disclosure and may not constitute prior art.

Known powertrain architectures include torque-generative devices, including internal combustion engines and torque machines which transmit torque through a transmission device to an output member. One exemplary powertrain includes a two-mode, compound-split, electromechanical transmission which uses an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

An engine is coupled to an input member of a hybrid transmission and the hybrid transmission is operative to transfer torque between the input member and a torque machine and an output member to generate an output torque in response to an operator torque request. The torque machine is connected to an energy storage device. A method for controlling the engine includes determining a preferred input torque from the engine to the hybrid transmission based upon operator inputs to an accelerator pedal and a brake pedal, determining maximum and minimum allowable input torques from the engine to the hybrid transmission, controlling the engine at the preferred input torque when the preferred input torque is within the maximum and minimum allowable input torques, and controlling the engine based upon the maximum and minimum allowable input torques when the preferred input torque is outside one of the maximum and minimum allowable input torques.

BRIEF DESCRIPTION OF THE DRAWINGS

One or more embodiments will now be described, by way of example, with reference to the accompanying drawings, in which.

DETAILED DESCRIPTION

Figure 1:
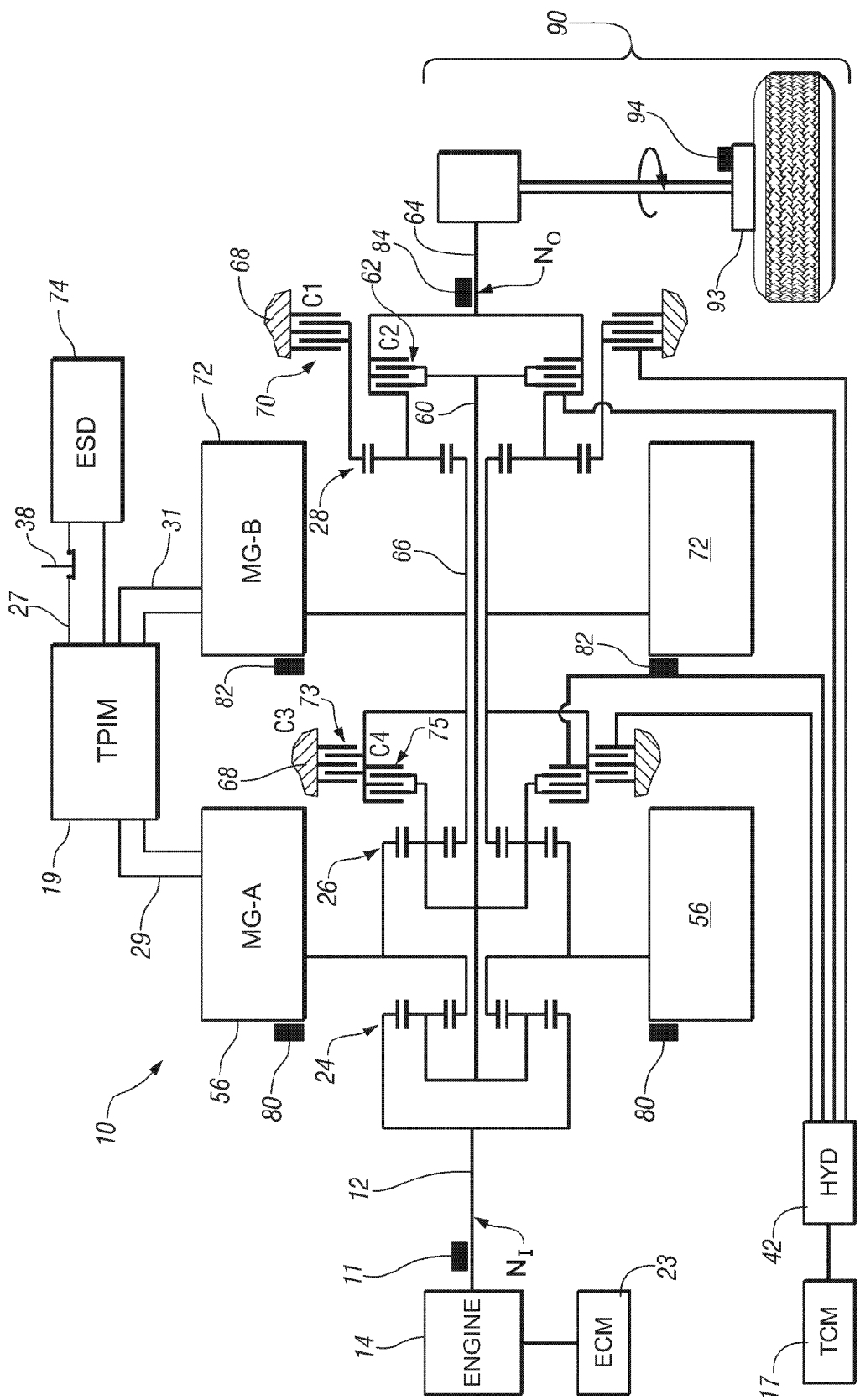
FIG. 1 is a schematic diagram of an exemplary powertrain, in accordance with the present disclosure.
Figure 2:
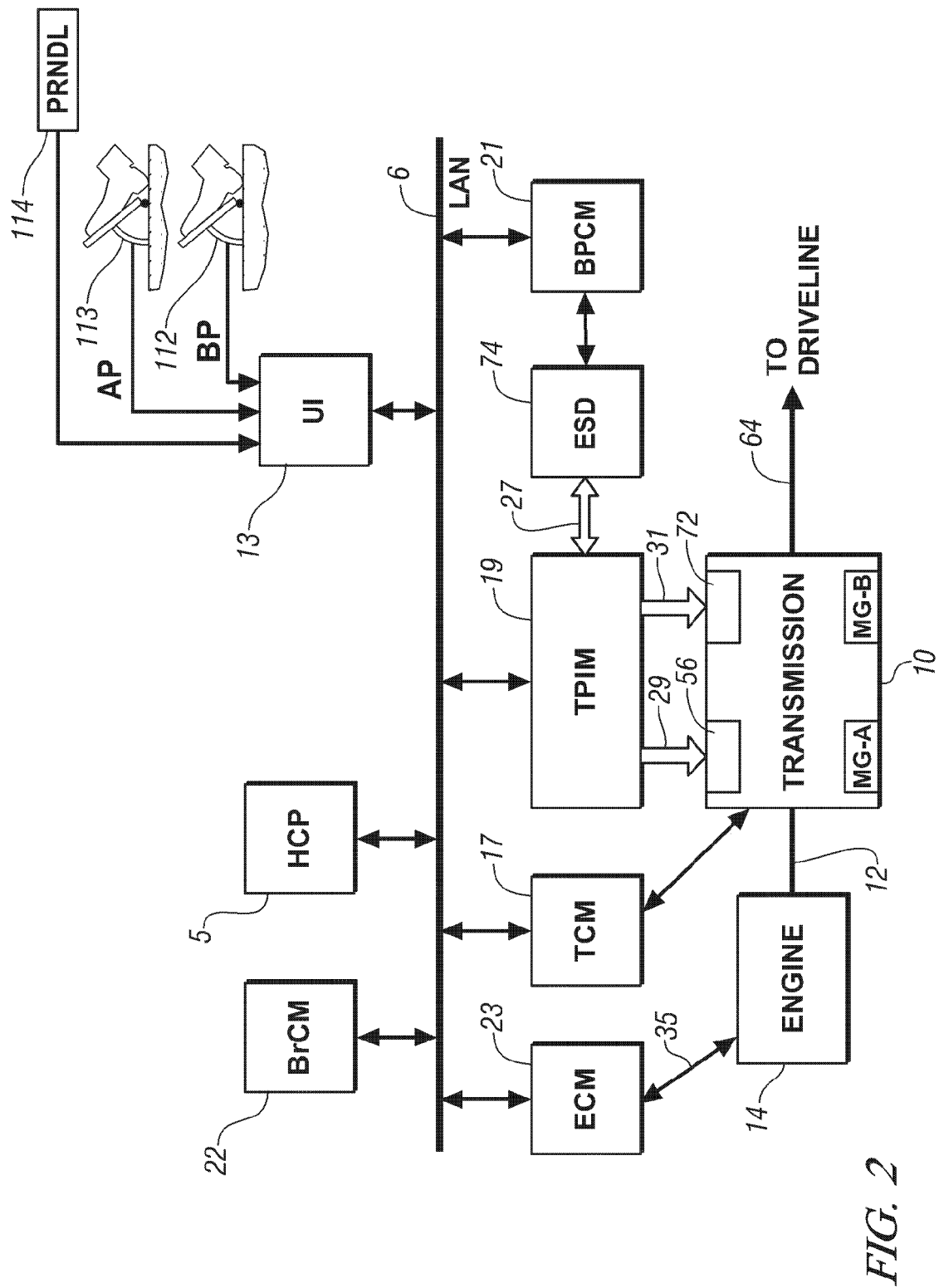
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary hybrid powertrain. The exemplary hybrid powertrain in accordance with the present disclosure is depicted in FIG. 1, comprising a two-mode, compound-split, electromechanical hybrid transmission 10 operatively connected to an engine 14 and torque machines comprising first and second electric machines ('MG-A') 56 and ('MG-B') 72. The engine 14 and the first and second electric machines 56 and 72 each generate power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and engine torque, can differ from the input speed N, and the input torque $T_I$ to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electromechanical hybrid powertrain. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol used is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torques $T_A$ and $T_B$ for the first and second electric machines 56 and 72.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicating parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several states that can be described in terms of engine states comprising one of an engine-on state ('ON') and an engine-off state ('OFF'), and transmission operating range states comprising a plurality of fixed gears and continuously variable operating modes, described with reference to Table 1, below.

TABLE 1

| Description | Engine State | Transmission Operating Range State | Applied Clutches | |
|---|---|---|---|---|
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque generative devices comprising the engine 14 and the first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, a commanded output torque from the transmission 10 to the driveline 90, an input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The engine state and the transmission operating range state are determined based upon a variety of operating characteristics of the hybrid powertrain. This includes the operator torque request communicated through the accelerator pedal 113 and brake pedal 112 to the user interface 13 as previously described. The transmission operating range state and the engine state may be predicated on a hybrid powertrain torque demand caused by a command to operate the first and second electric machines 56 and 72 in an electrical energy generating mode or in a torque generating mode. The transmission operating range state and the engine state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 at output member 64 that is required to meet the operator torque request while meeting other powertrain operating demands, e.g., charging the ESD 74. As should be apparent from the description above, the ESD 74 and the first and second electric machines 56 and 72 are electrically-operatively coupled for power flow therebetween. Furthermore, the engine 14, the first and second electric machines 56 and 72, and the electromechanical transmission 10 are mechanically-operatively coupled to transfer power therebetween to generate a power flow to the output member 64.

Figure 3:
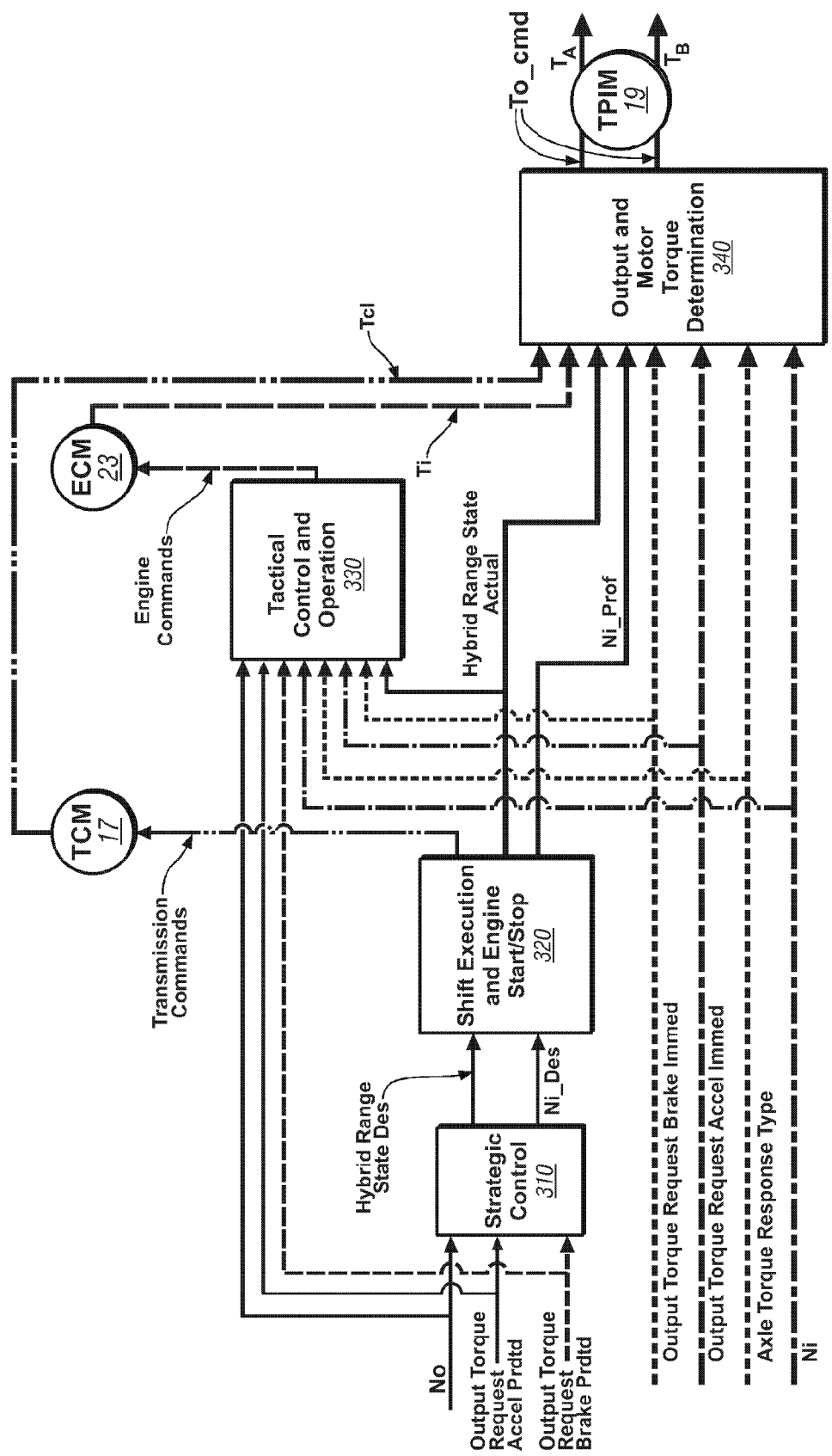
FIGS. 3 and 4 are schematic flow diagrams of a control system architecture for controlling and managing torque in a powertrain system, in accordance with the present disclosure.

FIG. 3 shows a control system architecture for controlling and managing signal flow in a hybrid powertrain system having multiple torque generative devices, described hereinbelow with reference to the hybrid powertrain system of FIGS. 1 and 2, and residing in the aforementioned control modules in the form of executable algorithms and calibrations. The control system architecture is applicable to alternative hybrid powertrain systems having multiple torque generative devices, including, e.g., a hybrid powertrain system having an engine and a single electric machine, a hybrid powertrain system having an engine and multiple electric machines. Alternatively, the hybrid powertrain system can use non-electric torque-generative machines and energy storage systems, e.g., hydraulic-mechanical hybrid transmissions (not shown).

The control system architecture shows signal flow of a plurality of inputs to a strategic optimization control scheme ('Strategic Control') 310, which determines a preferred input speed ('Ni_Des') and a preferred operating range state ('Hybrid Range State Des') based upon the output speed and the operator torque request, and optimized based upon other operating parameters of the hybrid powertrain, including battery power limits and response limits of the engine 14, transmission 10, and first and second electric machines 56 and 72. The strategic optimization control scheme 310 is preferably executed by the HCP 5 during each 100 ms loop cycle and each 25 ms loop cycle.

The outputs of the strategic optimization control scheme 310 are used in a shift execution and engine start/stop control scheme ('Shift Execution and Engine Start/Stop') 320 to command changes in the operation of the transmission 10 ('Transmission Commands') including changing the operating range state. This includes commanding execution of a change in the operating range state if the preferred operating range state is different from the present operating range state by commanding changes in application of one or more of the clutches C1 70, C2 62, C3 73, and C4 75 and other commands. The present operating range state ('Hybrid Range State Actual') and an input speed profile ('Ni_Prof') can be determined. The input speed profile is an estimate of an upcoming time-rate change in the input speed and preferably comprises a scalar parametric value that is a targeted input speed for the forthcoming loop cycle, based upon the engine operating commands and the operator torque request during a transition in the operating range state of the transmission.

A tactical control scheme ('Tactical Control and Operation') 330 is repeatedly executed during one of the control loop cycles to determine engine commands ('Engine Commands') for operating the engine 14, including a preferred input torque from the engine 14 to the transmission 10 based upon the output speed, the input speed, and the operator torque request and the present operating range state for the transmission. The engine commands also include engine states including one of an all-cylinder operating state and a cylinder deactivation operating state wherein a portion of the engine cylinders are deactivated and unfueled, and engine states including one of a fueled state and a fuel cutoff state.

A clutch torque ('Tcl') for each of the clutches C1 70, C2 62, C3 73, and C4 75 is estimated in the TCM 17, including the presently applied clutches and the non-applied clutches, and a present engine input torque ('Ti') reacting with the input member 12 is determined in the ECM 23. A motor torque control scheme ('Output and Motor Torque Determination') 340 is executed to determine the preferred output torque from the powertrain ('To_cmd'), which includes motor torque commands ('$T_A$', '$T_B$') for controlling the first and second electric machines 56 and 72 in this embodiment. The preferred output torque is based upon the estimated clutch torque(s) for each of the clutches, the present input torque from the engine 14, the present operating range state, the input speed, the operator torque request, and the input speed profile. The first and second electric machines 56 and 72 are controlled through the TPIM 19 to meet the preferred motor torque commands based upon the preferred output torque. The motor torque control scheme 340 includes algorithmic code which is regularly executed during the 6.25 ms and 12.5 ms loop cycles to determine the preferred motor torque commands.

The hybrid powertrain is controlled to transfer the output torque to the output member 64 and thence to the driveline 90 to generate tractive torque at wheel(s) 93 to forwardly propel the vehicle in response to the operator input to the accelerator pedal 113 when the operator selected position of the transmission gear selector 114 commands operation of the vehicle in the forward direction. Similarly, the hybrid powertrain is controlled to transfer the output torque to the output member 64 and thence to the driveline 90 to generate tractive torque at wheel(s) 93 to propel the vehicle in a reverse direction in response to the operator input to the accelerator pedal 113 when the operator selected position of the transmission gear selector 114 commands operation of the vehicle in the reverse direction. Preferably, propelling the vehicle results in vehicle acceleration so long as the output torque is sufficient to overcome external loads on the vehicle, e.g., due to road grade, aerodynamic loads, and other loads.

The BrCM 22 commands the friction brakes on the wheels 93 to apply braking force and generates a command for the transmission 10 to create a negative output torque which reacts with the driveline 90 in response to a net operator input to the brake pedal 112 and the accelerator pedal 113. Preferably the applied braking force and the negative output torque can decelerate and stop the vehicle so long as they are sufficient to overcome vehicle kinetic power at wheel(s) 93. The negative output torque reacts with the driveline 90, thus transferring torque to the electromechanical transmission 10 and the engine 14. The negative output torque reacted through the electromechanical transmission 10 can be transferred to the first and second electric machines 56 and 72 to generate electric power for storage in the ESD 74.

The operator inputs to the accelerator pedal 113 and the brake pedal 112 comprise individually determinable operator torque request inputs including an immediate accelerator output torque request ('Output Torque Request Accel Immed'), a predicted accelerator output torque request ('Output Torque Request Accel Prdtd'), an immediate brake output torque request ('Output Torque Request Brake Immed'), a predicted brake output torque request ('Output Torque Request Brake Prdtd') and an axle torque response type ('Axle Torque Response Type'). As used herein, the term 'accelerator' refers to an operator request for forward propulsion preferably resulting in increasing vehicle speed over the present vehicle speed, when the operator selected position of the transmission gear selector 114 commands operation of the vehicle in the forward direction. The terms 'deceleration' and 'brake' refer to an operator request preferably resulting in decreasing vehicle speed from the present vehicle speed. The immediate accelerator output torque request, the predicted accelerator output torque request, the immediate brake output torque request, the predicted brake output torque request, and the axle torque response type are individual inputs to the control system including to the tactical control scheme 330.

The immediate accelerator output torque request is determined based upon a presently occurring operator input to the accelerator pedal 113, and comprises a request to generate an immediate output torque at the output member 64 preferably to accelerate the vehicle. The immediate accelerator output torque request is unshaped, but can be shaped by events that affect vehicle operation outside the powertrain control. Such events include vehicle level interruptions in the powertrain control for antilock braking, traction control and vehicle stability control, which can be used to unshape or rate-limit the immediate accelerator output torque request.

The predicted accelerator output torque request is determined based upon the operator input to the accelerator pedal 113 and comprises an optimum or preferred output torque at the output member 64. The predicted accelerator output torque request is preferably equal to the immediate accelerator output torque request during normal operating conditions, e.g., when any one of antilock braking, traction control, or vehicle stability is not being commanded. When any one of antilock braking, traction control or vehicle stability is being commanded the predicted accelerator output torque request remains the preferred output torque with the immediate accelerator output torque request being decreased in response to output torque commands related to the antilock braking, traction control, or vehicle stability control.

Blended brake torque includes a combination of the friction braking torque generated at the wheels 93 and the output torque generated at the output member 64 which reacts with the driveline 90 to decelerate the vehicle in response to the operator input to the brake pedal 112.

The immediate brake output torque request is determined based upon a presently occurring operator input to the brake pedal 112, and comprises a request to generate an immediate output torque at the output member 64 to effect a reactive torque with the driveline 90 which preferably decelerates the vehicle. The immediate brake output torque request is determined based upon the operator input to the brake pedal 112 and the control signal to control the friction brakes to generate friction braking torque.

The predicted brake output torque request comprises an optimum or preferred brake output torque at the output member 64 in response to an operator input to the brake pedal 112 subject to a maximum brake output torque generated at the output member 64 allowable regardless of the operator input to the brake pedal 112. In one embodiment the maximum brake output torque generated at the output member 64 is limited to −0.2 g. The predicted brake output torque request can be phased out to zero when vehicle speed approaches zero regardless of the operator input to the brake pedal 112. As desired by a user, there can be operating conditions under which the predicted brake output torque request is set to zero, e.g., when the operator setting to the transmission gear selector 114 is set to a reverse gear, and when a transfer case (not shown) is set to a four-wheel drive low range. The operating conditions whereat the predicted brake output torque request is set to zero are those in which blended braking is not preferred due to vehicle operating factors.

The axle torque response type comprises an input state for shaping and rate-limiting the output torque response through the first and second electric machines 56 and 72. The input state for the axle torque response type can be an active state, preferably comprising one of a pleasability limited state a maximum range state, and an inactive state. When the commanded axle torque response type is the active state, the output torque command is the immediate output torque. Preferably the torque response for this response type is as fast as possible.

The predicted accelerator output torque request and the predicted brake output torque request are input to the strategic optimization control scheme ('Strategic Control') 310. The strategic optimization control scheme 310 determines a desired operating range state for the transmission 10 ('Hybrid Range State Des') and a desired input speed from the engine 14 to the transmission 10 ('Ni Des'), which comprise inputs to the shift execution and engine start/stop control scheme ('Shift Execution and Engine Start/Stop') 320.

A change in the input torque from the engine 14 which reacts with the input member from the transmission 10 can be effected by changing mass of intake air to the engine 14 by controlling position of an engine throttle utilizing an electronic throttle control system (not shown), including opening the engine throttle to increase engine torque and closing the engine throttle to decrease engine torque. Changes in the input torque from the engine 14 can be effected by adjusting ignition timing, including retarding spark timing from a mean-best-torque spark timing to decrease engine torque. The engine state can be changed between the engine-off state and the engine-on state to effect a change in the input torque. The engine state can be changed between the all-cylinder operating state and the cylinder deactivation operating state, wherein a portion of the engine cylinders are unfueled. The engine state can be changed by selectively operating the engine 14 in one of the fueled state and the fuel cutoff state wherein the engine is rotating and unfueled. Executing a shift in the transmission 10 from a first operating range state to a second operating range state can be commanded and achieved by selectively applying and deactivating the clutches C1 70, C2 62, C3 73, and C4 75.

Figure 4B:
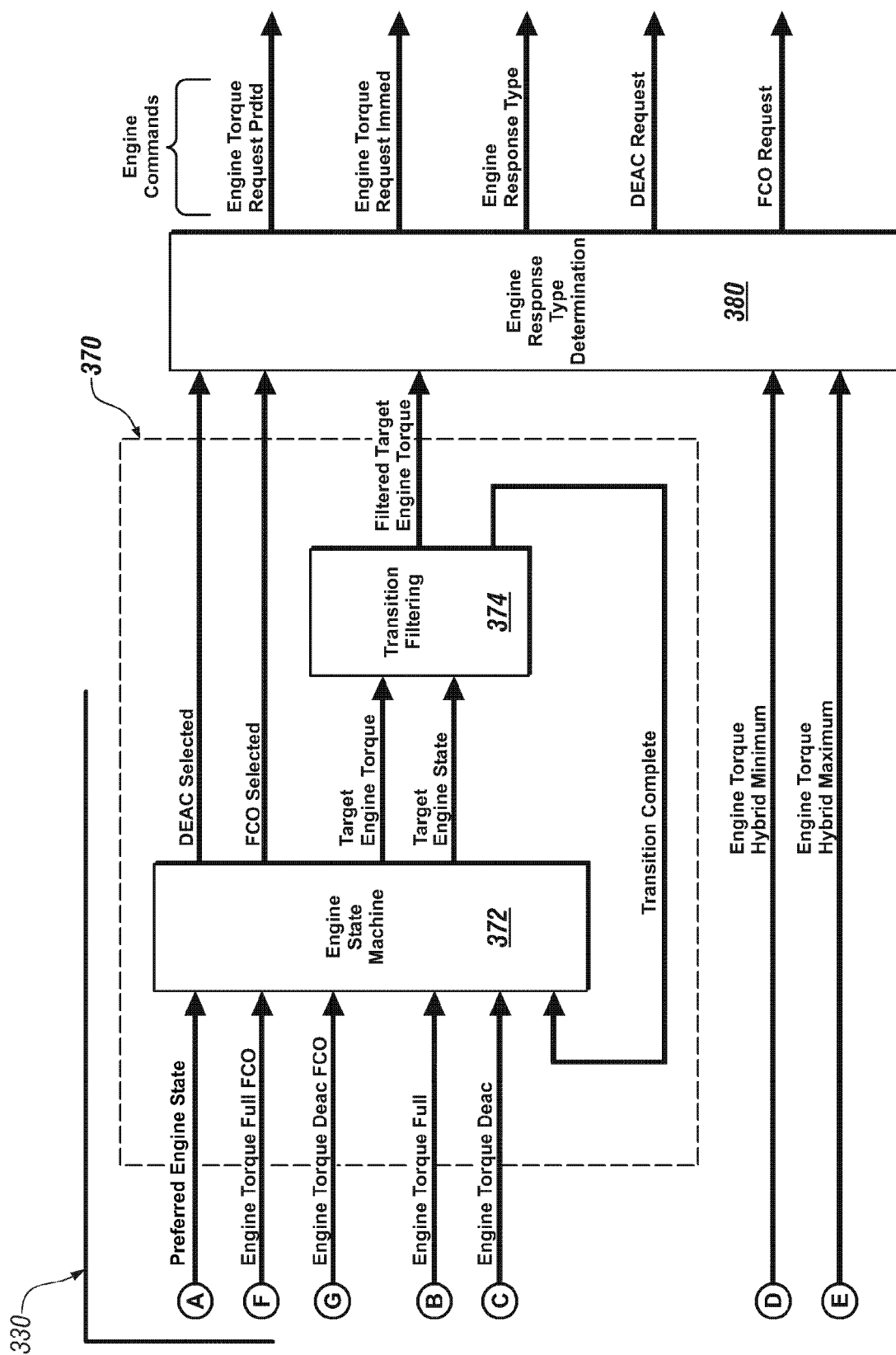

FIG. 4 details the tactical control scheme ('Tactical Control and Operation') 330 for controlling operation of the engine 14, described with reference to the hybrid powertrain system of FIGS. 1 and 2 and the control system architecture of FIG. 3. The tactical control scheme 330 includes a tactical optimization control path 350 and a system constraints control path 360 which are preferably executed concurrently. The outputs of the tactical optimization control path 350 are input to an engine state control scheme 370. The outputs of the engine state control scheme 370 and the system constraints control path 360 are input to an engine response type determination scheme ('Engine Response Type Determination') 380 for controlling the engine state, the immediate engine torque request and the predicted engine torque request.

The operating point of the engine 14 as described in terms of the input torque and input speed that can be achieved by controlling mass of intake air to the engine 14 when the engine 14 comprises a spark-ignition engine by controlling position of an engine throttle (not shown) utilizing an electronic throttle control device (not shown). This includes opening the throttle to increase the engine input speed and torque output and closing the throttle to decrease the engine input speed and torque. The engine operating point can be achieved by adjusting ignition timing, generally by retarding spark timing from a mean-best-torque spark timing to decrease engine torque.

When the engine 14 comprises a compression-ignition engine, the operating point of the engine 14 can be achieved by controlling the mass of injected fuel, and adjusted by retarding injection timing from a mean-best-torque injection timing to decrease engine torque.

The engine operating point can be achieved by changing the engine state between the engine-off state and the engine-on state. The engine operating point can be achieved by controlling the engine state between the all-cylinder state and the cylinder deactivation state, wherein a portion of the engine cylinders are unfueled and the engine valves are deactivated. The engine state can include the fuel cutoff state wherein the engine is rotating and unfueled to effect engine braking.

The tactical optimization control path 350 acts on substantially steady state inputs to select a preferred engine state and determine a preferred input torque from the engine 14 to the transmission 10. The inputs originate in the shift execution and engine operating state control scheme 320. The tactical optimization control path 350 includes an optimization scheme ('Tactical Optimization') 354 to determine preferred input torques for operating the engine 14 in the all-cylinder state ('Optimum Input Torque Full'), in the cylinder deactivation state ('Optimum Input Torque Deac'), the all-cylinder state with fuel cutoff ('Input Torque Full FCO'), in the cylinder deactivation state with fuel cutoff ('Input Torque Deac FCO'), and a preferred engine state ('Optimal Engine State'). Inputs to the optimization scheme 354 include a lead operating range state of the transmission 10 ('Lead Hybrid Range State') a predicted lead input acceleration profile ('Lead Input Acceleration Profile Predicted'), a predicted range of clutch reactive torques ('Predicted Clutch Reactive Torque Min/Max') for each presently applied clutch, predicted battery power limits ('Predicted Battery Power Limits') and predicted output torque requests for acceleration ('Output Torque Request Accel Prdtd') and braking ('Output Torque Request Brake Prdtd'). The predicted output torque requests for acceleration and braking are combined and shaped with the axle torque response type through a predicted output torque shaping filter 352 to yield a predicted net output torque request ('To Net Prdtd') and a predicted accelerator output torque request ('To Accel Prdtd'), which are inputs to the optimization scheme 354. The lead operating range state of the transmission 10 comprises a time-shifted lead of the operating range state of the transmission 10 to accommodate a response time lag between a commanded change in the operating range state and a measured change in the operating range state. The predicted lead input acceleration profile comprises a time-shifted lead of the predicted input acceleration profile of the input member 12 to accommodate a response time lag between a commanded change in the predicted input acceleration profile and a measured change in the predicted input acceleration profile. The optimization scheme 354 determines costs for operating the engine 14 in the engine states, which comprise operating the engine fueled and in the all-cylinder state ('$P_{COST\ FULL\ FUEL}$'), operating the engine unfueled and in the all-cylinder state ('$P_{COST\ FULL\ FCO}$'), operating the engine fueled and in cylinder deactivation state ('$P_{COST\ DEAC\ FUEL}$'), and operating the engine unfueled and in the cylinder deactivation state ('$P_{COST\ DEAC\ FCO}$'). The aforementioned costs for operating the engine 14 are input to a stabilization analysis scheme ('Stabilization and Arbitration') 356 along with the actual engine state ('Actual Engine State') and an allowable or permissible engine state ('Engine State Allowed') to select one of the engine states as the preferred engine state ('Optimal Engine State').

The preferred input torques for operating the engine 14 in the all-cylinder state and in the cylinder deactivation state with and without fuel cutoff are input to an engine torque conversion calculator 355 and converted to preferred engine torques in the all-cylinder state and in the cylinder deactivation state ('Engine Torque Full') and ('Engine Torque Deac') and with fuel cutoff in the all-cylinder state and in the cylinder deactivation state ('Engine Torque Full FCO') and ('Engine Torque Deac FCO') respectively, by taking into account parasitic and other loads introduced between the engine 14 and the transmission 10. The preferred engine torques for operation in the all-cylinder state and in the cylinder deactivation state and the preferred engine state comprise inputs to the engine state control scheme 370.

The costs for operating the engine 14 include operating costs which are generally determined based upon factors that include vehicle driveability, fuel economy, emissions, and battery usage. Costs are assigned and associated with fuel and electrical power consumption and are associated with a specific operating points of the hybrid powertrain. Lower operating costs are generally associated with lower fuel consumption at high conversion efficiencies, lower battery power usage, and lower emissions for each engine speed/load operating point, and take into account the present operating state of the engine 14.

The preferred engine state and the preferred engine torques in the all-cylinder state and in the cylinder deactivation state are input to the engine state control scheme 370, which includes an engine state machine ('Engine State Machine') 372. The engine state machine 372 determines a target engine torque ('Target Engine Torque') and a target engine state ('State') based upon the preferred engine torques and the preferred engine state. The target engine torque and the target engine state are input to a transition filter 374 which monitors any commanded transition in the engine state and filters the target engine torque to provide a filtered target engine torque ('Filtered Target Engine Torque'). The engine state machine 372 outputs a command that indicates selection of one of the cylinder deactivation state and the all-cylinder state ('DEAC Selected') and indicates selection of one of the engine-on state and the deceleration fuel cutoff state ('FCO Selected').

The selection of one of the cylinder deactivation state and the all-cylinder state and the selection of one of the engine-on state and the deceleration fuel cutoff state, the filtered target engine torque, and the minimum and maximum engine torques are input to the engine response type determination scheme 380.

The system constraints control path 360 determines the allowable input torques comprising minimum and maximum allowable input torques ('Input Torque Hybrid Minimum' and 'Input Torque Hybrid Maximum') that can be reacted by the transmission 10. The minimum and maximum allowable input torques are determined based upon constraints to the transmission 10 and the first and second electric machines 56 and 72, including clutch torques and battery power limits, which affect the capacity of the transmission 10 to react input torque during the current loop cycle. Inputs to the system constraints control path 360 include the immediate output torque request as measured by the accelerator pedal 113 ('Output Torque Request Accel Immed') and the immediate output torque request as measured by the brake pedal 112 ('Output Torque Request Brake Immed') which are combined and shaped with the axle torque response type through an immediate output torque shaping filter 362 to yield a net immediate output torque ('To Net Immed') and an immediate accelerator output torque ('To Accel Immed'). The net immediate output torque and the immediate accelerator output torque are inputs to a constraints scheme ('Output and Input Torque Constraints'). Other inputs to the constraints scheme 364 include the present operating range state of the transmission 10, an immediate lead input acceleration profile ('Lead Input Acceleration Profile Immed'), a lead immediate clutch reactive torque range ('Lead Immediate Clutch Reactive Torque Min/Max') for each presently applied clutch, and the available battery power ('Battery Power Limits') comprising the range $P_{BAT\_MIN}$ to $P_{BAT\_MAX}$. The immediate lead input acceleration profile comprises a time-shifted lead of the immediate input acceleration profile of the input member 12 to accommodate a response time lag between a commanded change in the immediate input acceleration profile and a measured change in the immediate input acceleration profile. The lead immediate clutch reactive torque range comprises a time-shifted lead of the immediate clutch reactive torque range of the clutches to accommodate a response time lag between a commanded change in the immediate clutch torque range and a measured change in the immediate clutch reactive torque range. The constraints scheme 364 determines an output torque range for the transmission 10, and then determines the minimum and maximum allowable input torques ('Input Torque Hybrid Minimum' and 'Input Torque Hybrid Maximum' respectively) that can be reacted by the transmission 10 based upon the aforementioned inputs. The minimum and maximum allowable input torques can change during ongoing operation, due to changes in the aforementioned inputs, including increasing energy recovery through electric power regeneration through the transmission 14 and first and second electric machines 56 and 72.

The minimum and maximum allowable input torques are input to the engine torque conversion calculator 355 and converted to minimum and maximum engine torques ('Engine Torque Hybrid Minimum' and 'Engine Torque Hybrid Maximum' respectively), by taking into account parasitic and other loads introduced between the engine 14 and the transmission 10.

The filtered target engine torque, the output of the engine state machine 372 and the engine minimum and maximum engine torques are input to the engine response type determination scheme 380, which inputs the engine commands to the ECM 23 for controlling the engine state, the immediate engine torque request and the predicted engine torque request. The engine commands include an immediate engine torque request ('Engine Torque Request Immed') and a predicted engine torque request ('Engine Torque Request Prdtd') that can be determined based upon the filtered target engine torque. Other commands control the engine state to one of the engine fueled state and the deceleration fuel cutoff state ('FCO Request') and to one of the cylinder deactivation state and the all-cylinder state ('DEAC Request'). Another output comprises the engine response type ('Engine Response Type'). When the filtered target engine torque is within the range between the minimum and maximum allowable engine torques, the engine response type is inactive. When the filtered target engine torque is outside the constraints of the minimum and maximum allowable engine torques ('Engine Torque Hybrid Minimum') and ('Engine Torque Hybrid Maximum') the engine response type is active, indicating a need for an immediate change in the engine torque, e.g., through engine spark control and retard to change the engine torque and the input torque to fall within the constraints of the minimum and maximum engine torques.

FIGS. 5-8 graphically depicts results illustrative of operation of the powertrain system described herein to control the engine 14 based upon a decrease in the maximum allowable input torque, which translates to a maximum allowable engine torque, as determined in the system constraints control path 360. Although the method generally describes controlling the engine torque based upon the maximum allowable input torque, it is to be understood that the method can also be applied when controlling engine power (that is, engine speed multiplied by engine torque) based the maximum allowable input power. The engine response type determination 380 determines the predicted engine torque request and the immediate engine torque request based upon the filtered target engine torque and constraints of the maximum and minimum engine torque. The predicted engine torque request is used to control engine torque by controlling the position of an engine throttle (not shown). The immediate engine torque request is used to control engine torque by controlling the position of the engine throttle and combustion timing.

The maximum allowable input torque to the transmission can decrease in response to a change in a vehicle operating condition. Exemplary changes in vehicle operating conditions that result in a decrease in the maximum allowable input torque changes in the net immediate output torque, the immediate accelerator output torque, the present operating range state of the transmission 10, the immediate lead input acceleration profile, the lead immediate clutch reactive torque range for each presently applied clutch, and the available battery power. The powertrain system may command actions resulting in immediate changes in the maximum and minimum allowable input torques during a transmission shifting event and during a traction control event, for example.

The engine torque can be controlled to maintain operation at or below the maximum allowable input torque by selecting and implementing a control strategy based whether a rate at which the maximum allowable input torque is decreasing is greater than a threshold rate. For example, when the rate at which the maximum allowable input torque is decreasing is less than the threshold rate, the engine torque can be reduced by modifying the position of the engine throttle. When the rate at which the maximum allowable input torque is decreasing is greater than the threshold rate, the engine torque can be reduced to a level below the maximum allowable input torque by modifying engine combustion timing. In an exemplary embodiment, the engine combustion timing is modified by retarding the spark timing. Retarding spark timing, as used herein, refers to adjusting the timing at which a spark plug (not shown) within the engine 14 fires such that the spark plug fires later in an engine crank cycle. However, in alternate embodiments, the engine torque can be controlled by modifying engine combustion timing by advancing spark timing, or can be controlled by controlling ignition timing by controlling fuel-injection timing, such as in a powertrain system comprising a combustion-ignition engine.

Figure 5:
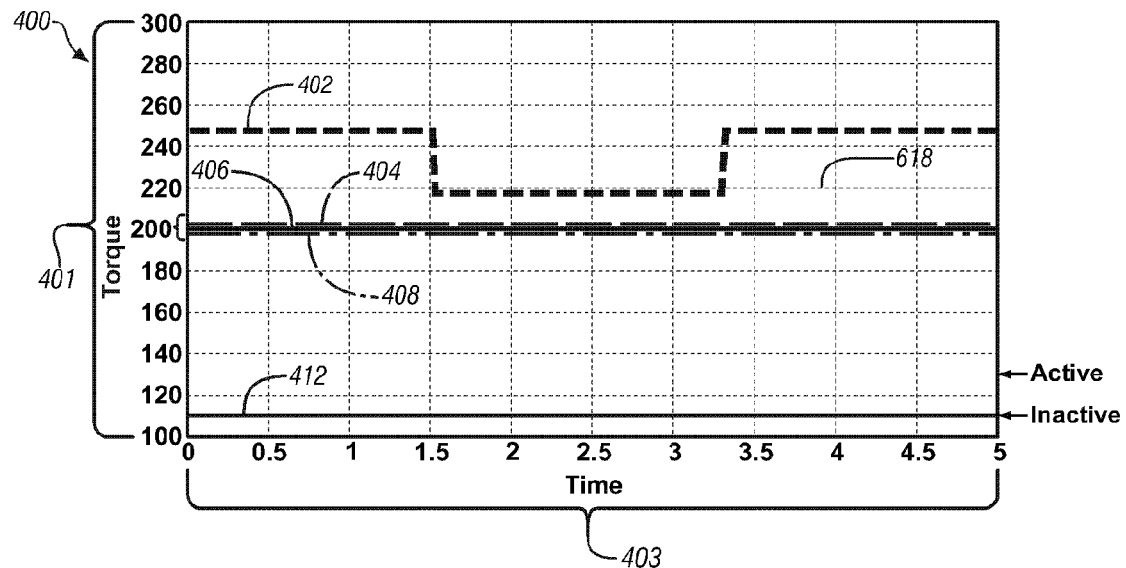
FIGS. 5-8 are graphical representations, in accordance with the present disclosure.

FIG. 5 depicts a graph 400 comprising a range of torque levels 401 in Newton-meters (N-m) on a y-axis and a time period 403 in seconds on an x-axis. The graph 400 shows a change in vehicle operating conditions causing the maximum engine torque 402 to decrease from 245 N-m to 218 N-m at 1.5 seconds and increase from 218 N-m to 245 N-m at 3.3 seconds. The graph 400 further shows filtered target engine torque 404, predicted engine torque request 406, and immediate engine torque request 408.

Although the maximum allowable input torque 402 decreases, the maximum allowable input torque 402 does not decrease below the filtered target engine torque 404. Since the maximum engine torque 402 does not decrease below the filtered target engine torque 404, the predicted engine torque request 406 and immediate engine torque request 408 are not modified based upon the decrease in the maximum allowable input torque 402. Therefore, the position of the engine throttle is not adjusted based upon the decrease in the maximum allowable input torque. Further, engine combustion timing is not adjusted based upon the decrease in the maximum allowable input torque 402 as indicating by spark retard signal 412 remaining inactive throughout the time period 403.

The difference between the maximum allowable input torque 402 and the filtered target engine torque 404 is indicating a torque reserve. The torque reserve is an amount of torque that the hybrid powertrain can provide to supplement an output torque of the transmission 10 under current conditions, while operating the engine at a stoichiometric air fuel ratio. As such the torque reserve provides a buffer between the maximum engine torque 402 and filtered target engine torque 404 and predicted engine torque request 406 such that the preferred torque can be maintained for operating the engine 14 based upon operating costs. The filtered target engine torque 404 is maintained at the preferred torque for operating the engine 14 even when the maximum engine torque 402 decreases, so long as the maximum allowable input torque 402 remains greater than the filtered target engine torque 404, thereby maintaining the filtered target engine torque 404 at the preferred engine torque based vehicle driveability, fuel economy, emissions, and battery usage.

Figure 6:
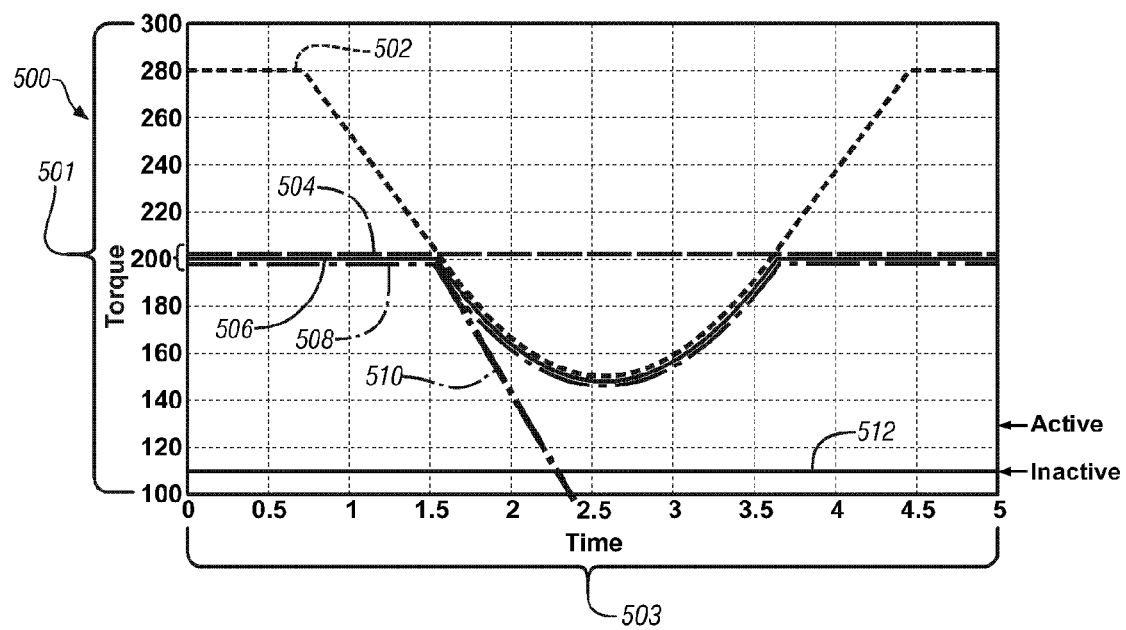

FIG. 6 depicts a graph 500 comprising a range of torque levels 501 in Newton-meters (N-m) on a y-axis and a time period 503 in seconds on an x-axis. The graph 500 illustrates a change in vehicle operating conditions causing the maximum allowable input torque 502 to decrease from 280 N-m to 150 N-m between 0.7 seconds and 2.6 seconds and subsequently increase from 150 N-m to 280 N-m between 2.6 seconds and 4.5 seconds. The graph 500 further shows filtered target engine torque 504, predicted engine torque request 506, immediate engine torque request 508, and a threshold line 510. The slope of threshold line 510 is indicating a threshold rate and corresponds to the maximum torque change rate achievable by adjusting the position of the engine throttle. At 1.5 seconds the maximum allowable input torque 502 approaches the filtered target engine torque 504. Since the maximum engine torque is decreasing at a rate that is less than the threshold rate 510, the engine torque is adjusted by modifying the predicted engine torque request 506 to adjust the position of the engine throttle, and combustion timing is not adjusted. The modification in the predicted engine torque request 506 during the time period between 1.5 second and 3.6 seconds corresponds to changes in the predicted engine torque request 506 outputted by the engine response type determination scheme 380 to adjust the position of the engine throttle. Since engine combustion timing is not adjusted throughout the time period 503 as indicated by spark retard 512 remaining inactive, the immediate engine torque request 508 remains equal to the predicted engine torque request 506 throughout the time period 503.

Figure 7:
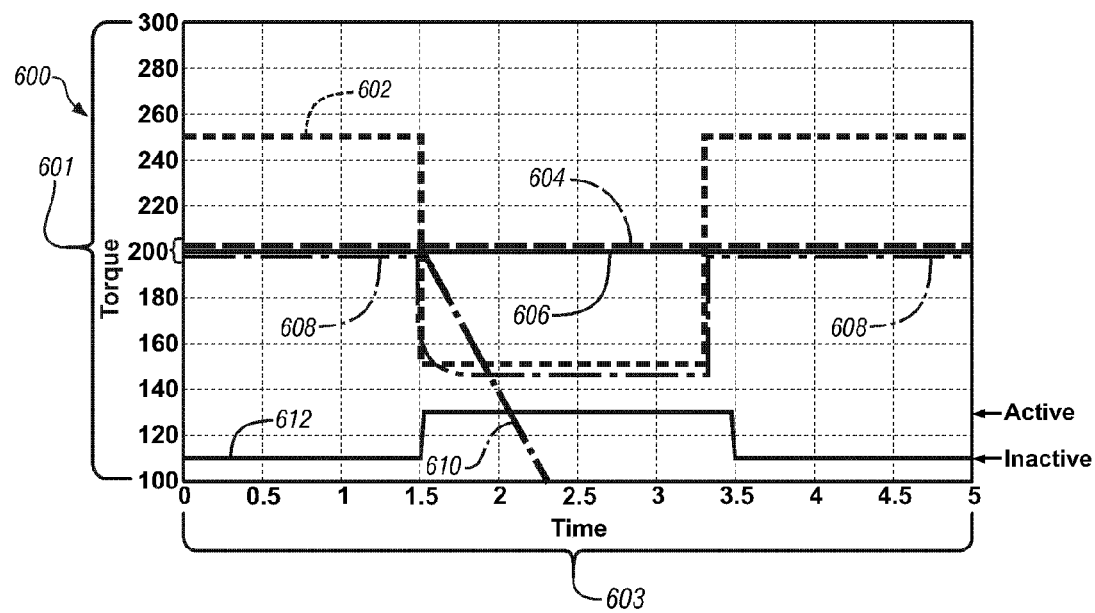

FIG. 7 depicts a graph 600 comprising a range of torque levels 601 in Newton-meters (N-m) on a y-axis and a range of time in seconds 603 on an x-axis. The graph 600 illustrates a change in vehicle operating conditions causing the maximum allowable input torque 602 to decrease from 250 N-m to 150 N-m at 1.5 seconds and subsequently increase from 150 N-m to 250 N-m at 3.3 seconds. The graph 600 further shows engine torque 604, predicted engine torque request 606, immediate engine torque request 608, and a threshold line 610. The slope of the threshold line 610 indicates the threshold rate and corresponds to the maximum torque change rate achievable by adjusting the position of the engine throttle. At the 1.5 second point, the maximum allowable input torque 602 equals the filtered target engine torque 604. Since the maximum allowable input torque is decreasing at a rate that is greater than the threshold rate, the engine torque is adjusted by modifying the immediate engine torque request 608 to command the engine 14 to retard combustion timing as shown by the engine response type 612 adjusting from an inactive status to an active status. The position of the engine throttle is not adjusted and the predicted engine torque remains 606 constant over the time period 603. Since the position of the engine throttle is not adjusted in response to the decrease in maximum engine torque, the position of the engine throttle is maintained at a desired position for controlling the engine torque when at 3.3 seconds the constraint of the maximum engine maximum engine torque increases and the combustion timing is advanced to a desired value for operation under nominal operating conditions.

Figure 8:
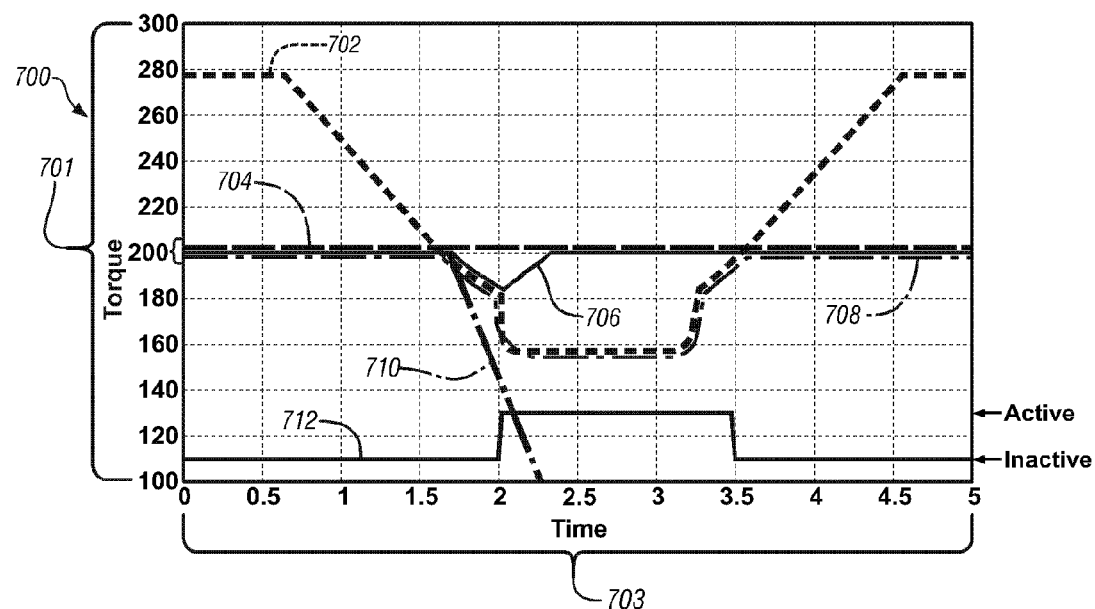

FIG. 8 depicts a graph 700 comprising a range of torque levels 701 in Newton-meters (N-m) on a y-axis and a time period 703 in seconds on an x-axis. The graph 700 illustrates a change in vehicle operating conditions causing maximum allowable input torque 702 to decrease from 279 N-m to 182 N-m during a time period between 0.7 seconds and 2.0 seconds at a first torque decrease rate. At 2.0 seconds, the maximum allowable input torque 702 decreases from 182 N-m to 159 N-m at a second torque decrease rate. Approximately one second after the maximum allowable input torque decreased rate changes from the first torque decrease rate to the second torque decrease rate, the maximum allowable input torque 702 increases from 159 N-m at 3.2 seconds to 279 N-m at 4.5 seconds, exceeding the filtered target engine torque 704 at 3.5 seconds. The graph 700 further shows predicted engine torque request 706, immediate engine torque request 708, and a threshold line 710. The slope of the threshold line 610 indicates the threshold rate and corresponds to the maximum torque change rate achievable by adjusting the position of the engine throttle. The first torque decrease rate is less than the threshold rate. Therefore, during a time period between 0.7 seconds and 2.0 seconds, when the maximum engine torque 702 decreases at the first torque decrease rate, the engine torque is adjusted by modifying the predicted engine torque request 706 to adjust the position of the engine throttle, and combustion timing is not adjusted. When, at 2.0 seconds, the engine torque decreases at the second torque decrease rate, the engine torque is adjusted by modifying the immediate engine torque request 708 to command retardation of combustion timing as shown by the engine response type 712 adjusting from an inactive status to an active status, and the predicted engine torque request 706 and the position of the engine throttle are modified to a desired position based upon the previously determined preferred engine torque. At the 3.2 second point, the maximum engine torque 702 increases, the engine combustion timing advances until the immediate engine torque request 708 meets the filtered target engine torque 704 at 3.5 seconds.

The method for controlling the engine 14 in response to a change in the maximum engine torque provides fuel efficient operation of the engine 14 by maintaining the engine torque at the preferred torque for the engine when the maximum allowable input torque decreases so long as the maximum allowable input torque is greater than the preferred torque for operating the engine 14. Further, the method for controlling the engine 14 in response to a change in the maximum allowable input torque provides fuel efficient operation in that the method reduces engine torque in response to the change in the maximum allowable input torque by adjusting the position of the engine throttle when the rate of decrease of the maximum allowable input torque is below the threshold, and reduces engine torque by adjusting combustion timing only when the rate of decrease of the maximum allowable input torque is above the threshold. The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling an engine coupled to an input member of a hybrid transmission, the hybrid transmission operative to transfer torque between the input member and a torque machine and an output member to generate an output torque in response to an operator torque request, and the torque machine connected to an energy storage device, the method comprising:
   determining a preferred input torque from the engine to the hybrid transmission based upon operator inputs to an accelerator pedal and a brake pedal;
   determining maximum and minimum allowable input torques from the engine to the hybrid transmission;
   controlling the engine at the preferred input torque when the preferred input torque is within the maximum and minimum allowable input torques;
   controlling the engine based upon the maximum and minimum allowable input torques when the preferred input torque is outside one of the maximum and minimum allowable input torques;
   determining a decrease in the maximum allowable input torque;
   selectively controlling combustion timing to decrease the input torque based upon the determined decrease in the maximum allowable input torque;
   determining a rate of decrease in the maximum allowable input torque;
   controlling combustion timing based upon the determined rate of decrease when the maximum allowable input torque exceeds the preferred input torque; and
   adjusting a position of an engine throttle when the determined rate of decrease in the maximum allowable input torque is less than a threshold rate.

2. The method of claim 1 further comprising determining the maximum allowable input torque based upon a net immediate output torque, an immediate accelerator output torque, a present operating range state of the transmission device, an immediate lead input acceleration profile, a lead immediate clutch reactive torque range, and an available battery power.

3. The method of claim 1, further comprising controlling the combustion timing only until the preferred input torque is less than the maximum allowable input torque.

4. The method of claim 1, wherein controlling combustion timing comprises one of retarding spark timing and adjusting fuel injection timing.

5. The method of claim 1, further comprising controlling the combustion timing only until the maximum allowable input torque decreases to the preferred input torque.

6. Method for controlling an engine coupled to an input member of a hybrid transmission, the hybrid transmission operative to transfer torque between the input member and a torque machine and an output member to generate an output torque in response to an operator torque request, the method comprising:
   determining a preferred input torque from the engine to the hybrid transmission;
   determining an input torque constraint based upon a capacity of the hybrid transmission to react input torque from the engine;
   determining a rate of change in the input torque constraint; and
   controlling engine operation to adjust the preferred input torque when the determined rate of change in the input torque constraint is greater than a threshold, comprising adjusting combustion timing based upon the rate of change in the input torque constraint when a maximum allowable input torque exceeds the preferred input torque, and adjusting a position of an engine throttle when the determined rate of change in the input torque constraint is less than a threshold rate.

7. The method of claim 6, wherein adjusting combustion timing comprises adjusting spark timing.

8. The method of claim 6, wherein adjusting combustion timing comprises adjusting fuel injection timing.

9. The method of claim 6, wherein the input torque constraint comprises one of a minimum and a maximum allowable input torque from the engine to the hybrid transmission.

10. Method for controlling an engine coupled to an input member of a hybrid transmission, the hybrid transmission operative to transfer torque between the input member and a torque machine and an output member to generate an output torque in response to an operator torque request, and the torque machine connected to an energy storage device, the method comprising:

- determining a preferred input torque from the engine to the hybrid transmission based upon operator inputs to an accelerator pedal and a brake pedal;
- determining maximum and minimum allowable input torques from the engine to the hybrid transmission;
- controlling the engine at the preferred input torque when the preferred input torque is within the maximum and minimum allowable input torques;
- controlling the engine based upon the maximum and minimum allowable input torques when the preferred input torque is outside one of the maximum and minimum allowable input torques;
- determining a first rate of decrease in the maximum allowable input torque;
- adjusting a position of an engine throttle to decrease the input torque based upon the first rate of decrease;
- determining a second rate of decrease in the maximum allowable input torque when adjusting the position of the engine throttle; and
- retarding spark to decrease input torque based upon the second rate of decrease.

11. Method for controlling an engine coupled to an input member of a hybrid transmission, the hybrid transmission operative to transfer torque between the input member and a torque machine and an output member to generate an output torque in response to an operator torque request, the method comprising:

- determining a preferred input torque from the engine to the hybrid transmission;
- determining an input torque constraint based upon a capacity of the hybrid transmission to react input torque from the engine and the output torque responsive to the operator torque request;
- determining a rate of change in the input torque constraint; and
- controlling engine operation to adjust the preferred input torque when the determined rate of change in the input torque constraint is greater than a threshold, comprising adjusting combustion timing based upon the rate of change in the input torque constraint when a maximum allowable input torque exceeds the preferred input torque, and adjusting a position of an engine throttle when the determined rate of change in the input torque constraint is less than a threshold rate.

* * * * *